July 17, 1923. 1,461,874
J. GUERRIERI
ARTICHOKE TRIMMER AND CUTTER
Filed Sept. 12, 1922
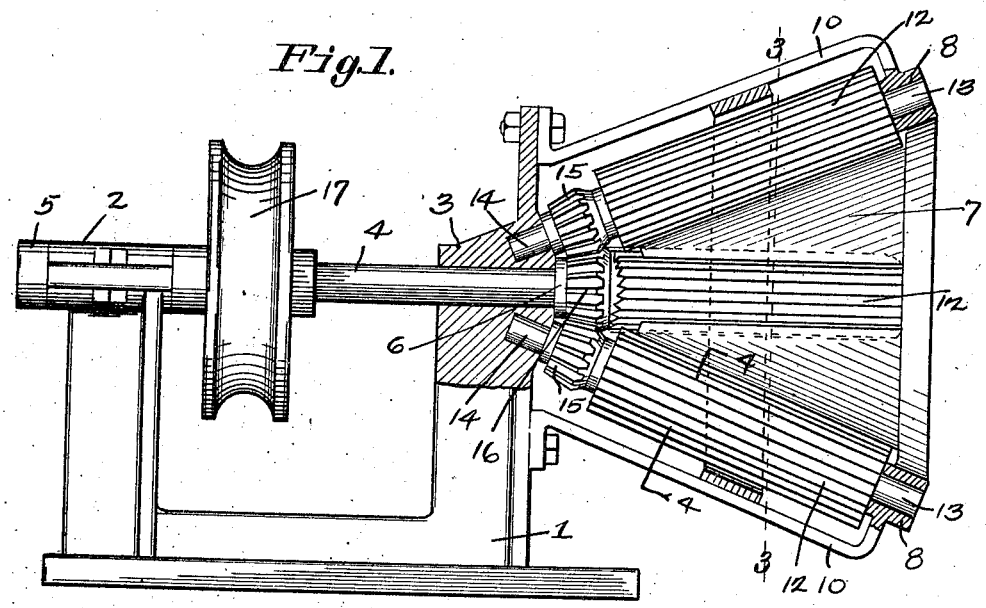
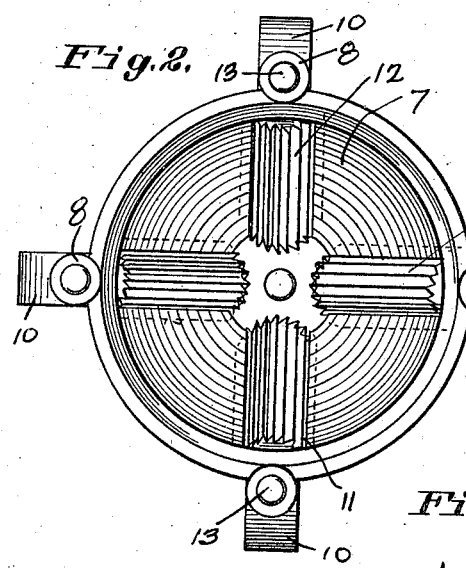
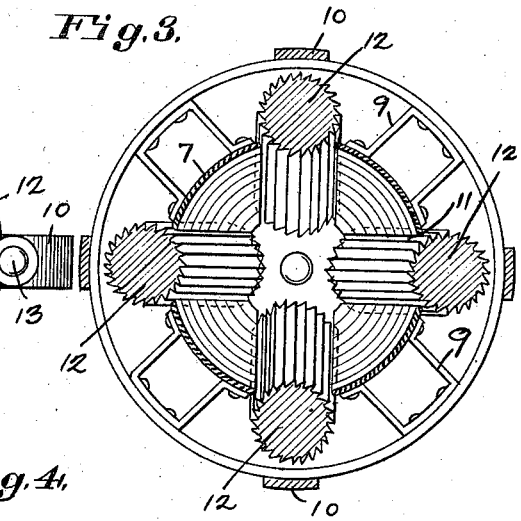
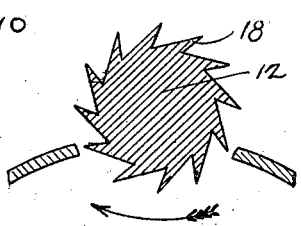
Inventor,
JOSEPH GUERRIERI Patented July 17, 1923.

1,461,874

UNITED STATES PATENT OFFICE.

JOSEPH GUERRIERI, OF SAN FRANCISCO, CALIFORNIA.

ARTICHOKE TRIMMER AND CUTTER.

Application filed September 12, 1922. Serial No. 587,675.

*To all whom it may concern:*

Be it known that I, JOSEPH GUERRIERI, a citizen of the United States, and a resident of the city and county of San Francisco, State of California, have made a new and useful invention—to wit, Improvements in Artichoke Trimmers and Cutters; and I do hereby declare the following to be a full, clear, concise, and exact description of the same.

This invention relates particularly to an apparatus for trimming off the rough and superfluous leaves and exteriors of vegetables, particularly artichokes.

An object of the invention is to provide an apparatus into which an artichoke may be placed and the irregular contour thereof relieved of dry and unpalatable leaves by paring or trimming the same to a uniform diameter.

A further object of the invention is to provide an artichoke trimming apparatus that will be superior in point of simplicity and inexpensiveness of construction, facility and convenient in use and general efficiency. Other objects and advantages will appear as this description progresses.

In this specification and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the accompanying one sheet of drawings,

Fig. 1 represents a side elevation, partly in section, of an artichoke trimmer and cutter constructed in accordance with my invention.

Fig. 2 is an end elevation of Fig. 1.

Fig. 3 is a cross-section taken through Fig. 1 on the line 3—3.

Fig. 4 is an enlarged cross-section taken in Fig. 1 on the line 4—4.

In detail the construction illustrated in the drawings comprises a frame or base 1 adapted to be mounted in a stationary position on a table or work bench readily accessible for operation. The frame 1 is provided with bearings 2 and 3 thereon and in which the shaft 4 is adapted to be rotatably journaled. Thrust collars 5 and 6 are arranged on the opposite ends of the shaft 4 for preventing longitudinal disarrangement thereof.

A cone-shaped housing 7 is arranged adjacent one end of the bearing 3 on frame 1 substantially coaxial with the axis of the shaft 4. The housing 7 is provided with a plurality of bearings 8 arranged peripherally around the flared end thereof and spaced at equidistant intervals, said bearings and housing being connected by suitable brackets 9 and connector members 10 to the frame 1.

The housing 7 is provided with a plurality of lengthwise extended slots 11 therein, through which a plurality of trimming and cutting elements 12 are adapted to be positioned. The opposite ends of each of the cutting elements 12 are reduced in diameter to permit the outer ends 13 to be journaled in the bearings 8 and the inner ends 14 journaled in the bearing 3 of the frame 1. The cutting elements 12 are of a uniform diameter throughout and the face thereof that projects within the interior of the housing 7 substantially parallels the inner wall thereof. The plurality of bevel pinions 15 are securely mounted on the shaft ends 14, each of which are arranged in meshing engagement with a master bevel pinion 16 fixed on the projecting ends of the shaft 4. A belt pulley 17 is fixedly mounted on the shaft 4 intermediate the ends thereof which said pulley is connected with a prime mover either in the nature of an electric motor or an engine or the like. Although the shaft 4 has been illustrated and described with a pulley thereon, it is to be understood as being clearly within the scope of this invention to place a prime mover in direct connection with said shaft for obtaining rotary movement thereof.

Thus power or movement applied to the pulley 17 commences the shaft 4 in rotation which movement is transmitted through the master pinion 16 to the respective cutter elements pinions 15 causing them to revolve in the same direction within the stationary housing 7. Each of cutting and trimming elements 12 are provided with cutting edges 18 arranged longitudinally throughout the entire circumference thereof. The sharpened edges of said elements project within the inner face of the housing 7 a distance sufficient to contact with any article placed within the said housing. In the ordinary operation of the apparatus the cutter would be started revolving and the cone-shaped body of an artichoke arranged, point in, within the housing 7 so that the rough exterior and leaves thereon would be trimmed and cut away to a uniform size by the action of the rotary cutters thereon. After removing the superfluous portions of the artichoke the pared and finished article would be removed and thence suitably treated preparatory to preserving.

Having thus described this invention, what I claim and desire to secure by Letters Patent is:—

1. A device such as described comprising a frame; a cone-shaped casing mounted on said frame; a plurality of cutting elements journaled in said frame; a rotary shaft on said frame and driving means interposed adjacent said shaft and cutting elements.

2. A device such as described comprising, a frame; a cone-shaped casing fixed on said frame; a plurality of cutting elements journaled in said frame and having the cutting edges thereof arranged parallel with and projecting inside said casing wall; a rotary shaft journaled on said frame; and driving means interposed adjacent said shaft and cutting elements.

3. A device such as described comprising, a frame; a cone-shaped casing fixed on said frame; a plurality of cutting elements journaled in said frame and having the cutting edges thereof arranged parallel with and projecting inside said casing wall; a rotary shaft journaled on said frame; driving means interposed adjacent said shaft and cutting elements and a prime mover connected to said shaft.

4. A device such as described comprising a frame; a cone-shaped casing mounted on said frame; a plurality of cutting elements journaled in said frame and having the cutting edges thereof projecting within the interior of said casing; pinions mounted on adjacent ends of each of said cutting elements; a rotary shaft journaled on said frame and a pinion on said shaft meshing with the pinions on said cutting elements, whereby all of said elements will be driven in unison.

5. A device such as described comprising a frame; a cone-shaped casing mounted on said frame; a plurality of cutting elements journaled in said frame and having the cutting edges thereof projecting within the interior of said casing; pinions mounted on adjacent ends of each of said cutting elements; a rotary shaft journaled on said frame; a prime mover connected to said shaft; and a pinion on said shaft meshing with the pinions on said cutting elements, whereby all of said elements will be driven in unison.

In testimony whereof I have hereunto set my hand at San Francisco, California, this 6th day of September, 1922.

JOSEPH GUERRIERI.

In presence of—
LINCOLN V. JOHNSON.